US011471851B2

(12) United States Patent
Johnson et al.

(10) Patent No.: US 11,471,851 B2
(45) Date of Patent: Oct. 18, 2022

(54) MULTI-STAGE SYSTEM FOR PROCESSING HYDROCARBON FUELS

(71) Applicant: H Quest Partners, LP, Pittsburgh, PA (US)

(72) Inventors: Alan A. Johnson, Calgary (CA); George L. Skoptsov, Pittsburgh, PA (US)

(73) Assignee: H Quest Partners, LP, Pittsburgh, PA (US)

( * ) Notice: Subject to any disclaimer, the term of this patent is extended or adjusted under 35 U.S.C. 154(b) by 280 days.

(21) Appl. No.: 16/523,549

(22) Filed: Jul. 26, 2019

(65) Prior Publication Data

US 2020/0016569 A1 Jan. 16, 2020

Related U.S. Application Data

(60) Continuation of application No. 15/365,399, filed on Nov. 30, 2016, now Pat. No. 10,363,542, which is a
(Continued)

(51) Int. Cl.
*B01J 19/12* (2006.01)
*C10G 15/08* (2006.01)
(Continued)

(52) U.S. Cl.
CPC .......... *B01J 19/126* (2013.01); *B01J 19/088* (2013.01); *C10G 1/06* (2013.01); *C10G 15/08* (2013.01);
(Continued)

(58) Field of Classification Search
CPC .................. B01J 19/126; B01J 19/088; B01J 2219/0877; B01J 2219/0879;
(Continued)

(56) References Cited

U.S. PATENT DOCUMENTS 1,709,815 A * 4/1929 Walton .................. C10G 15/00
204/155
4,010,089 A 3/1977 Stowell et al.
(Continued)

FOREIGN PATENT DOCUMENTS

CN 2821468 Y 9/2006
EP 2606003 A1 6/2013
(Continued)

OTHER PUBLICATIONS

Strohm et al., Lowering the Cost and Environmental Impact of Direct Coal Liquefaction through Wave Liquefaction (TM) Technology, published Jun. 2, 2013.
(Continued)

*Primary Examiner* — Xiuyu Tai
(74) *Attorney, Agent, or Firm* — Fox Rothschild LLP

(57) ABSTRACT

A method for converting hydrocarbon materials into a product includes receiving a hydrocarbon feedstock in a first reaction chamber, receiving a process gas in the first reaction chamber, and forming a first set of discharge conditions in the presence of energy from a microwave generator, in the first reaction chamber, to convert the hydrocarbon feedstock into an intermediate product for delivery to a second reaction chamber. The method also includes delivering the intermediate product to the second reaction chamber, forming a second set of discharge conditions, and converting the intermediate product into a final product in the second reaction chamber.

5 Claims, 4 Drawing Sheets

Related U.S. Application Data division of application No. 14/464,284, filed on Aug. 20, 2014, now abandoned.

(60) Provisional application No. 61/867,909, filed on Aug. 20, 2013.

(51) Int. Cl.
  B01J 19/08 (2006.01)
  C10G 1/06 (2006.01)

(52) U.S. Cl.
  CPC ............... *B01J 2219/0877* (2013.01); *B01J 2219/0879* (2013.01); *B01J 2219/0892* (2013.01); *B01J 2219/1206* (2013.01)

(58) Field of Classification Search
  CPC ........ B01J 2219/0892; B01J 2219/1206; B01J 20/20; B01J 2219/1227; B01J 2219/00941; B01J 2219/1272; B01J 2219/00835; B01J 2219/00826; B01J 2219/00792; B01J 2219/1245; B01J 2219/1215; B01J 2219/1239; B01J 2219/0086; B01J 2219/1269; B01J 2219/0894; B01J 2219/00822; B01J 19/0093; C10G 1/06; C10G 15/08; C10G 32/02; C10G 9/24; C10G 1/08; C10G 1/02; C10G 1/00; H05H 1/4622; H05H 1/46; C01B 32/39; H01P 7/06
  USPC .................................................. 204/157.43
  See application file for complete search history.

(56) References Cited

U.S. PATENT DOCUMENTS

| | | | |
|---|---|---|---|
| 4,144,189 A * | 3/1979 | Kirkbride | B01J 8/42 204/157.15 |
| 4,454,022 A | 6/1984 | Shoji et al. | |
| 4,487,683 A | 12/1984 | Bozzuto | |
| 5,679,215 A | 10/1997 | Barnes et al. | |
| 5,750,823 A | 5/1998 | Wofford et al. | |
| 6,224,836 B1 | 5/2001 | Moisan et al. | |
| 6,506,584 B1 | 1/2003 | Chandler et al. | |
| 7,022,505 B2 | 4/2006 | Chandler et al. | |
| 7,581,549 B2 | 9/2009 | Johnson et al. | |
| 7,799,119 B2 | 9/2010 | Zakrzewski et al. | |
| 8,657,999 B2 | 2/2014 | Lissianski et al. | |
| 2005/0167260 A1 | 8/2005 | Kong et al. | |
| 2007/0102279 A1* | 5/2007 | Novak | B01J 19/126 204/157.6 |
| 2007/0131591 A1 | 6/2007 | Pringle | |
| 2008/0314730 A1* | 12/2008 | Pringle | C10G 1/04 204/157.6 |
| 2009/0038932 A1 | 2/2009 | Denslow et al. | |
| 2009/0232725 A1* | 9/2009 | Aaron | B01J 20/20 423/461 |
| 2009/0260973 A1 | 10/2009 | Proudkii et al. | |
| 2009/0295509 A1 | 12/2009 | Master et al. | |
| 2010/0307960 A1 | 12/2010 | Lissianski et al. | |
| 2010/0308036 A1 | 12/2010 | Tomita et al. | |
| 2012/0024843 A1 | 2/2012 | Lissianski et al. | |
| 2012/0082593 A1 | 4/2012 | Stiller et al. | |
| 2012/0186972 A1 | 7/2012 | Li et al. | |
| 2013/0062193 A1 | 3/2013 | Proudkii et al. | |
| 2013/0165710 A1 | 6/2013 | Hemmings et al. | |
| 2013/0213795 A1 | 8/2013 | Strohm et al. | |
| 2014/0014494 A1 | 1/2014 | Blue et al. | |
| 2014/0364516 A1* | 12/2014 | Kuhl | B01J 19/0013 422/162 |

FOREIGN PATENT DOCUMENTS

| | | |
|---|---|---|
| JP | H110310777 A | 11/1998 |
| RU | 2462500 C2 | 7/2013 |
| WO | 2011047446 A1 | 4/2011 |
| WO | 2011131207 A1 | 10/2011 |

OTHER PUBLICATIONS

Moisan et al., "Multitube surface-wave discharges for increased gas throughput at atmospheric pressure", Journal of Applied Physics, vol. 83, No. 11, Jun. 1, 1998, pp. 5691-5701.

Verkerk, Arjan, "Surface-wave discharges in a XeCl laser mixture", A search for novel microwave applications, Master Thesis, Jul. 2005.

* cited by examiner

MULTI-STAGE SYSTEM FOR PROCESSING HYDROCARBON FUELS

RELATED APPLICATIONS AND CLAIM OF PRIORITY

This application claims priority to and is a continuation of U.S. patent application Ser. No. 15/365,399, filed Nov. 30, 2016, which claims priority to and is a divisional of U.S. patent application Ser. No. 14/464,284, filed Aug. 20, 2014, which claims priority to U.S. Provisional Patent Application No. 61/867,909, filed Aug. 20, 2013. The disclosure of each of the priority applications are fully incorporated by reference. This patent document is also related to U.S. patent application Ser. Nos. 14/464,250 and 14/464,345, now U.S. Pat. Nos. 9,044,730 and 9,095,835, which were filed on the same date as this application.

BACKGROUND

Because of the world's increasing demand for petroleum products, it has been desirable to find alternative hydrocarbon feedstocks for fuel. For example, it is known to convert coal to liquid fuels using a family of processes known as coal liquefaction. Such processes are disclosed in, for example, U.S. Pat. No. 4,487,683, the disclosure of which is fully incorporated herein by reference. It is also known to upgrade liquid hydrocarbon to fuel-quality products. Such processes are disclosed in, for example, U.S. Pat. No. 7,022,505, the disclosure of which is fully incorporated herein by reference.

Many current liquefaction and hydrocarbon upgrading processes have adverse environmental consequences due to high input energy requirements and high rates of $CO_2$ emissions and of fresh water consumption, and often are practically and/or economically unable to meet the scale required for commercial production. Accordingly, improved systems for converting and upgrading hydrocarbon fuel products are needed.

This document describes methods and systems that are directed to the problems described above.

SUMMARY

In an embodiment, a method for converting hydrocarbon materials into a product includes: (i) receiving, in a first reaction chamber, a hydrocarbon feedstock; (ii) receiving, in the first reaction chamber, a process gas; (iii) delivering a first type of energy into the first reaction chamber to form a first set of process conditions that activates or ionizes the process gas and converts the hydrocarbon feedstock into an intermediate product; (iv) delivering the intermediate product and the activated and/or ionized process gas to a second reaction chamber; (v) delivering a second type of energy into the second reaction chamber to form a second set of process conditions, wherein one of the first type of energy or the second type of energy comprises microwave energy and the other of the first type of energy or the second type of energy is a type of energy other than microwave energy; and (vi) using, in the second reaction chamber in the presence of the second type of energy, the activated and/or ionized process gas to convert the intermediate product into a final product.

Optionally, the method also includes processing the intermediate product before delivering the intermediate product to the second reaction chamber.

In one or more embodiments, the process gas may include methane, the hydrocarbon feedstock may include coal, and converting the hydrocarbon feedstock into an intermediate product may include converting the coal into a vaporized and/or aerosolized hydrocarbon. Furthermore, converting the intermediate product into the final product comprises converting the vaporized and/or aerosolized hydrocarbon into the final product.

In some embodiments, the first type of energy comprises microwave energy, and the second type of energy comprises thermal energy.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

This document describes systems for processing hydrocarbon materials, such as through liquefaction or through upgrading into a fuel-grade material or intermediate material. The processing may include altering the arrangement of carbon and hydrogen atoms and/or removal of heteroatoms such as sulphur, nitrogen, and oxygen. The examples described below will use coal as an example of the material to be processed. However, the system may be used to process various naturally occurring hydrocarbon-based materials such as fossil hydrocarbons and biomass. Examples of fossil hydrocarbons may include among other things, coal, bitumen, oil sands, tar sands, oil shale, petroleum resids, asphaltenes, pre-asphaltenes or other vitrinite and kerogen-containing materials and fractions or derivatives thereof. In some embodiments, the feedstock may be comprised of solid or partially solid, gaseous and/or liquid materials. The system may also be used to process hydrocarbon gases such as natural gas, methane, propane, butane, ethane, ethylene, and other hydrocarbon compounds, and their mixtures, which are normally in a gaseous state of matter at room temperature and atmospheric pressure. The system also may be used to process other hydrocarbon-based materials such as municipal waste, sludge, or other carbon-rich materials.

Figure 1:
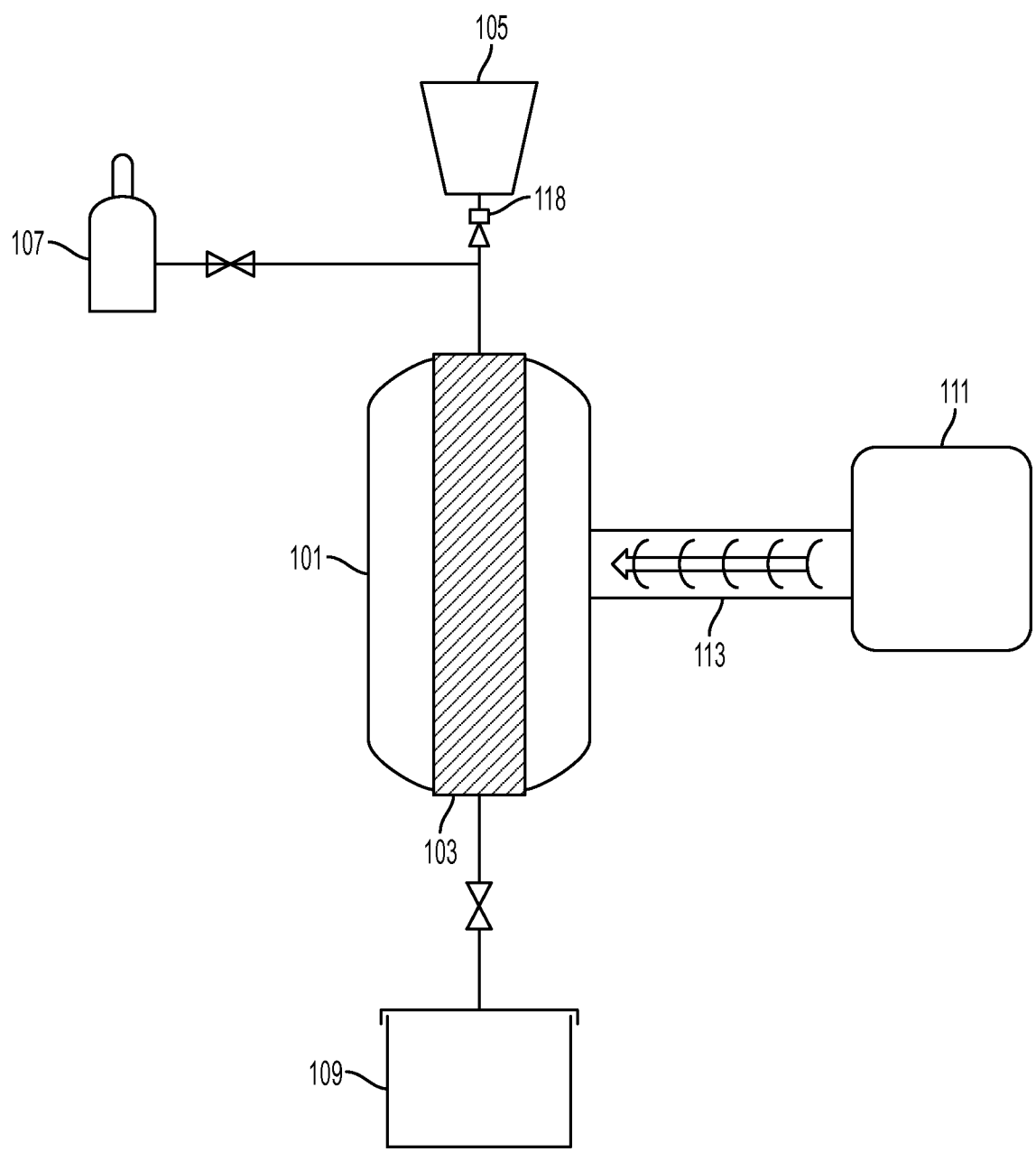
FIG. 1 is a flow schematic of a system for processing hydrocarbons.

FIG. 1 illustrates an example of a system for processing coal or other hydrocarbons. A reaction chamber 101 may be used to convert the feedstock into a liquid fuel, or upgrade the feedstock to a fuel product or intermediate product. The reaction chamber may receive feedstock from one or more hydrocarbon feedstock sources 103, such as a coal hopper. The feedstock may be in powder form (such as coal particles), optionally entrained in a gas (e.g., a mixture of natural gas, hydrogen or argon). In certain embodiments, the feedstock may be in vapor phase, when process gas temperature is higher than the boiling point of the feedstock or feedstock fractions and compounds. It may also be in liquid form as an atomized spray, droplets, emulsions, or aerosols entrained in a process gas. The hydrocarbon feedstock may be supplemented with any suitable catalyst or supplemental material, such as various metals, metal oxide salts or powders, carbon material, or other metallic materials or organometallic species which may enhance the reaction caused by microwave radiation as described below. Examples of catalysts may include materials containing iron, nickel, cobalt, molybdenum, carbon, copper, silica, oxygen, or other materials or combinations of any of these materials. The feedstock may be delivered via any suitable means, such as in powdered form and forced into the system by an injection device 118.

The reaction may occur at relatively low bulk process temperatures and pressures. For example, conversion and upgrading may occur with average reaction chamber pressures between 0.1 and 10 atmospheres, temperatures between −182° C. and 200° C. (the average reaction chamber temperature) and between 200° C. and 1600° C. (localized plasma temperature), and residence times between 0.001 and 600 seconds. Other parameters are possible.

A flow of process gas from a process gas source 107 may be injected or otherwise delivered to the hydrocarbon feedstock before, after, or as it enters the reaction chamber 101. The process gas will react with the feedstock in the reaction chamber to yield the final product. The process gas may include, for example, hydrogen, methane or other compounds of hydrogen and carbon. Multiple process gas sources 107 may be available so that a combination of process gases is directed into the reaction chamber. An example process gas combination includes an inert gas such as argon, helium, krypton, neon or xenon. The process gas also may include carbon monoxide (CO), carbon dioxide ($CO_2$), water vapor ($H_2O$), methane ($CH_4$), hydrocarbon gases ($C_nH_{2n+2}$, $C_nH_n$, $C_nH_n$, where n=2 through 6), and hydrogen ($H_2$) gases.

The system includes a microwave generator 111, along with a waveguide 113 that directs radiation from the generator 111 into the chamber 101. The reaction chamber may include a reaction tube 103 made of quartz, borosilicate glass, alumina, sapphire, or another suitable dielectric material that enhances reaction of materials within the tube when microwave radiation is directed into the chamber 101. When provided at a suitable intensity and time duration, the microwave radiation resonates within the chamber 101, and causes a plasma to form within the reaction tube 103. The reaction may include processes such as chemical vapor deposition, gasification, thermal pyrolysis, radical reaction chemistry, ion reactions, microwave-enhanced reactions, and/or ion sputtering. The result of the reaction may be a product stream comprising a plurality of products characterized by different chemical and/or physical properties than the original reactant, as a result of rearrangement of atoms within the molecules, change in number of atoms per molecule, or number of molecules present, that may be delivered to one or more product storage vessels 109.

Figure 2:
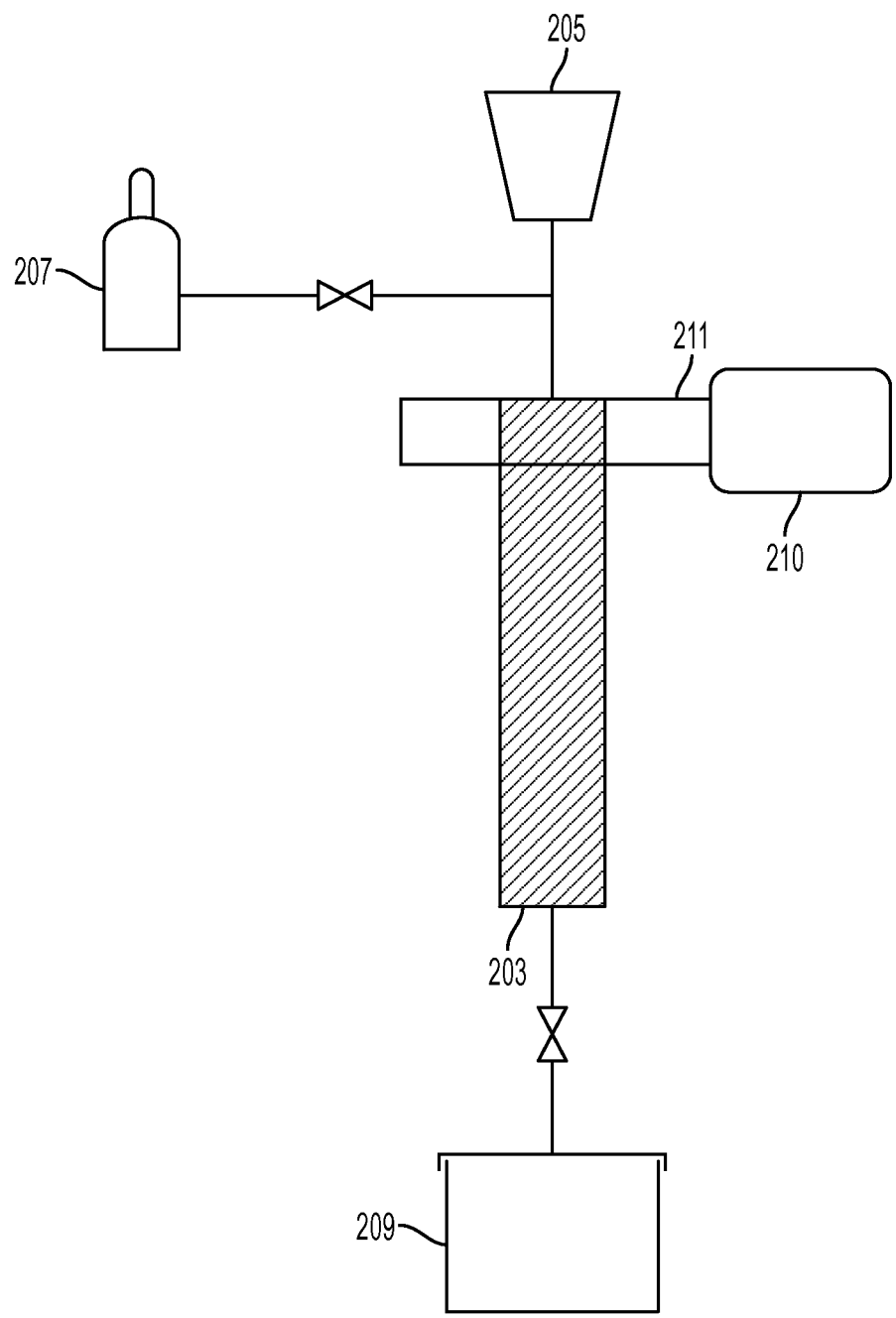
FIG. 2 is a flow schematic of an alternate system for processing hydrocarbons.

Any of the features described above may be incorporated into an alternate embodiment uses a waveguide with the reaction tube. Examples of a waveguide may include a waveguide surfatron, a surfatron, or a surfaguide. With such a system, the microwaves are launched by a wave launcher having a circular gap. As shown in FIG. 2, the surfaguide may include a waveguide 211 for receiving and launching microwave energy from a microwave generator 210 into the reaction tube 203 of the reaction chamber as feedstock and catalysts from feed sources 205, 207 are received into the reaction tube 203. As shown, the waveguide 211 includes an elongated cavity having an axis (length) that extends away from the microwave generator 210. The reaction tube 203 is received into an opening of the waveguide 211 and extends from and optionally through the waveguide 211 in a direction that is perpendicular to the length axis of the waveguide 211. Here, the feedstock supply 207, 205 passes through the waveguide 211 as or shortly after the feedstock is received into the reaction tube 203. The energy may cause the formation of a plasma within the reaction tube 203, thus converting or upgrading the feedstock for delivery into a product storage facility 209. There may be microwave discharge (plasma) within the cavity induced by the microwave energy entering the cavity. Microwave energy may also may induce electric discharges in ionized gas that rapidly and locally heat surrounding gas and hydrocarbon feedstocks. The waveguide 211 may include a capacitive couple, and the operation frequency of the surface wave sustained discharge may be up to 10 GHz. Other configurations of the waveguide/surfaguide are possible, so long as the system includes at least one waveguide and at least one reaction tube.

Figure 3:
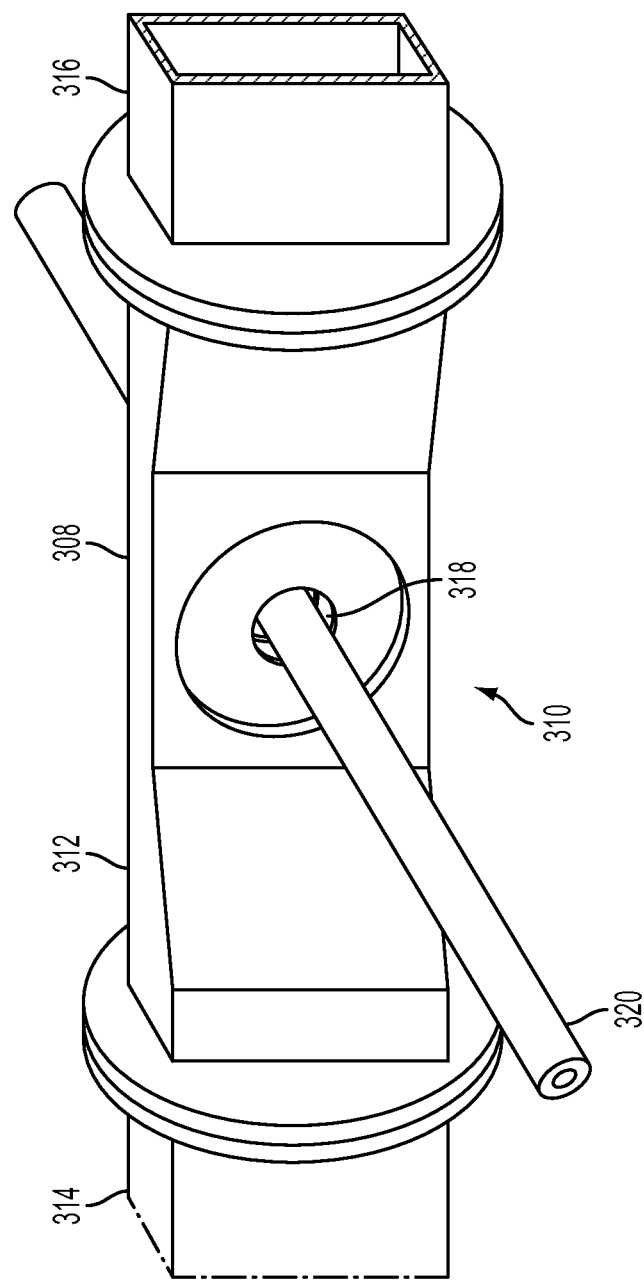
FIG. 3 is an illustration of an example of a surfaguide that may be used with the disclosed system.

FIG. 3 illustrates an example of a surfaguide 310 that serve as a wave launcher of FIG. 2. In FIG. 3, the surfaguide 310 includes a housing 312 made of an electrically conductive material. Example materials include metals with high conductivity such as copper, aluminum, zinc, brass, iron, steel and alloys and combinations thereof. One end 314 of the housing is configured to be connected to the output of a microwave generator, while the opposite end 316 is closed to contain the generated waves. As shown, the housing includes a central portion 308 with a depth dimension that is smaller than the depth dimension (front face to rear face based on the orientation shown in FIG. 5) of the ends 314, 316. The central portion 308 includes an opening 318 through which the reaction tube 320 passes. The opening 318 may be circular, or it may have other shapes. The reaction tube 320 is positioned so that its length is substantially perpendicular to the depth dimension of the housing 312. Examples of such a surfaguide 310 are described in more detail in U.S. Pat. Nos. 6,224,836, and 7,799,119 the disclosures of which are fully incorporated herein by reference. In operation, the housing 312 concentrates the radiation that is received from the microwave generator, via an opening at end 314, onto the tube 320 so as to propagate an electromagnetic surface wave within the tube 320. When the surface wave interacts with the feedstock and other reaction materials, it causes the generation of a plasma within the tube. In certain embodiments, the length of the plasma created by the surfaguide may be longer.

Figure 4:
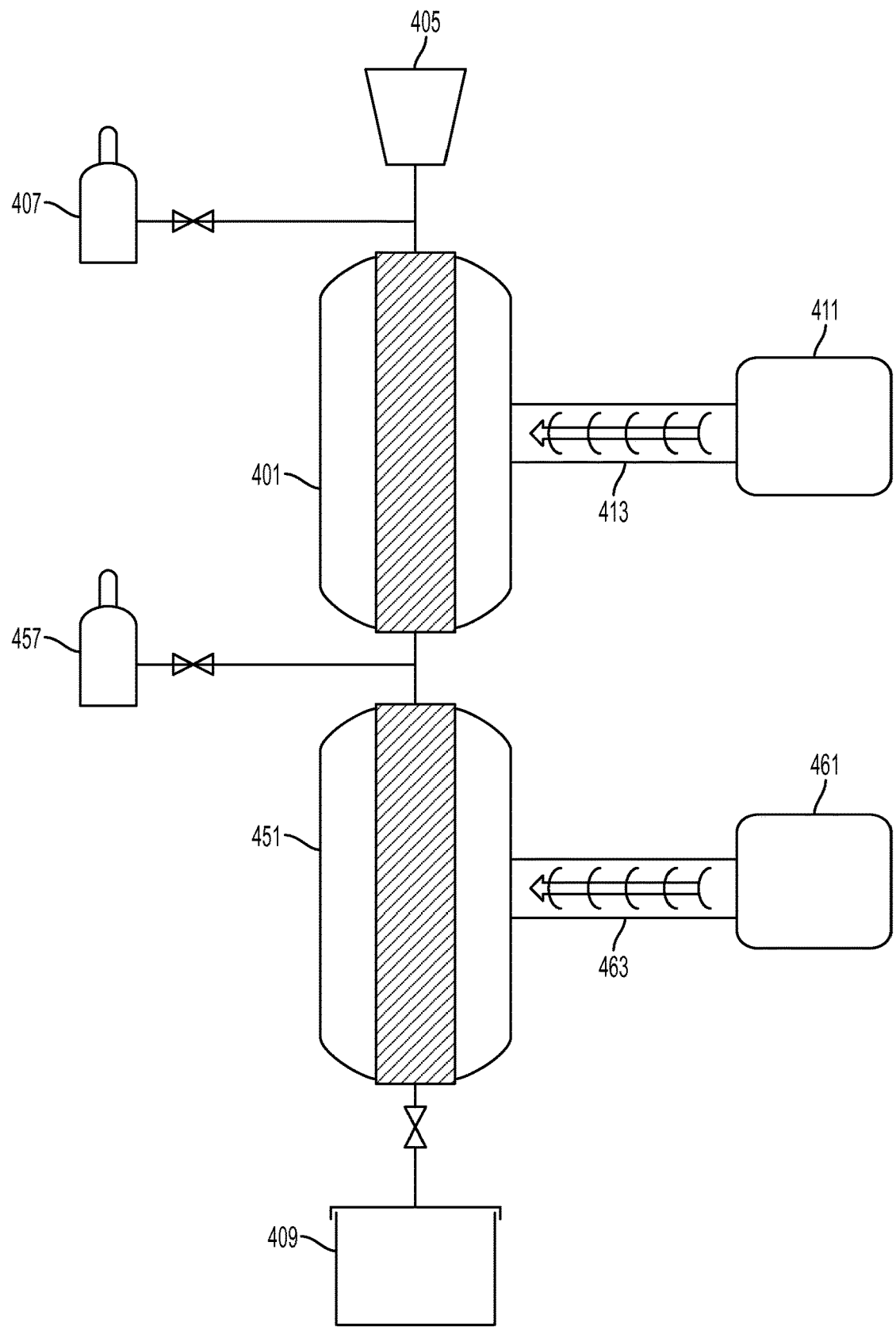
FIG. 4 is an illustration of a multi-stage system.

In some embodiments, to fully process a feedstock material such as coal into a fuel-grade liquid, different process conditions may be required. FIG. 4 illustrates a two-stage system that may be used for such a process. In this system, two reaction vessels 401 and 451 are provided in series connection. The first vessel 401 receives one or more feedstocks from the feedstock source 405 and one or more process gases from the process gas source 407. A first microwave generator 411 and first waveguide 413 deliver microwave energy into the first stage reaction vessel 401. The frequency and intensity of the energy, the specific composition of the process gases introduced and the processing time may be sufficient to process all or part of feedstock into an intermediate product. The intermediate product may include a combination of unreacted coal, partially reacted coal, some percentage of fully reacted coal, char, and a variety of hydrocarbon fractions ranging in carbon atom number from 2 to 370, or may include partially converted final product, or a product that could be considered final but for which additional processing will occur in the second stage.

Example energy frequencies that may be applied from the microwave generator(s) may include those in the range of 10 Hz-10 GHz, or any frequencies that may promote ionization of process gas. Example processing times in each stage of the system may be less than a second (on order of 100 ms), but can have a 0.001-600 second range, as well as other ranges. The second stage of the system may include a second vessel 451 in which the intermediate product will be processed further to complete conversion into final product or to increase conversion yield. One or more process gases or vapors may be available via a second gas source 457. In certain embodiments, additional secondary reactants and/or raw materials may be added to the second vessel 451, in addition to the intermediate product. A second microwave generator 461 and second waveguide 463 deliver microwave energy into the second stage reaction vessel 451. The frequency and intensity of the energy, the specific composition of the process gases introduced and the processing time may be sufficient to process the intermediate material into a final product, such as synthetic crude oil with hydrocarbon fraction having at least one of the following properties: low molecular weight, low boiling point, and low percentage of aromatics. The final product may be stored in one or more storage facilities 409.

In each case, when energy is applied in the reaction chamber, process gas passing through the reaction chamber is ionized and activated as result of the microwave or electric discharge. Process gas may also be heated. The particles of coal or other hydrocarbon material are contacted by with discharges and heated as they pass through the reactor while in contact with the microwave or electric discharge. The coal or other hydrocarbon may additionally be heated through dielectric heating, as its structure may change after a certain temperature and its conductive and dielectric properties may change. In particular, when the hydrocarbon material is rapidly heated, the following may occur: (1) volatile compounds and/or moisture present in the particles are rapidly vaporized and may cause rapid (explosive) disintegration of the particles; (2) these vaporized compounds, which may vary in molecular weight, may react with radicals and ions in the activated, excited and/or ionized process gas; (3) large hydrocarbon molecule(s) (macromolecules) start breaking apart, and the broken-off compounds varying in molecular weight are vaporized and capped by hydrogen and methyl radicals (by-products of process gas ionization; and (4) some macromolecules may not be broken up or only partially broken up, resulting in partially reacted or unreacted hydrocarbon particles. In some embodiments, bulk temperatures (gas stream temperatures) on the exit from reactor generally do not exceed 200-300° C., although other and higher temperatures are possible.

As an example, the input of the first stage system may be coal and process gas; the output of the first stage may be coal, fully reacted coal (char), partially reacted coal, and a range of vaporized and aerosolized hydrocarbon molecules that vary in molecular size (e.g., as much as 370 carbon atoms or greater or molecular weight of 5000) and chemical structure (such as alkanes/paraffins, cycloalkanes/napthenes, 1,2,3,4,n-ring aromatics, etc). In the second stage of multistage system the second stage may process unreacted/partially reacted coal. The second stage also may process heavier hydrocarbon fractions to reduce them to lighter fractions.

The process parameters for each stage can be separately adjusted for the desired result. For example, the first stage may be set using parameters that primarily break down feedstock hydrocarbon particles, without worrying about quality of the product. Then, the second stage can be optimized to break down heavier products into desirable lighter products. The parameters that may vary in each stage may include energy frequency, process time, process gas(es) used, catalyst(s) used, and other parameters. These parameters may be varied to increase output having lower (or higher) boiling points, lower (or higher) carbon number, lower (or higher) molecular weight, higher (or lower) hydrogen: carbon ratios, or different paraffin/naphthene structures.

As an example, in some embodiments the process gas of the first stage may primarily comprise methane. The process conditions selected in the first stage can be those that focus on activating and/or ionizing the methane, so that the activated/ionized gas can be passed to the second stage to convert the intermediate product into the final product. In the second stage, the vaporized and aerosolized intermediate product from another source or a vaporized and aerosolized hydrocarbon feedstock can interact with the methane plasma in presence of additional microwave discharge. The second stage may have different process parameters, such as a higher residence time and lower power draw, than the first stage in order to focus on product conversion rather than process gas activation. Optionally, the conditions in the second stage may form a plasma.

As an example, in some embodiments the process gas of the first stage may exclude methane. The process conditions selected in the first stage can be those that focus on breaking down or converting feedstock hydrocarbon macromolecules into an intermediate product characterized by lower molecular weight, lower carbon atom count, and lower boiling point than those of the feedstock, but higher molecular weight, higher carbon atom count, and higher boiling point than that of the desired final product. In the second stage, additional methane input is ionized and activated, and promotes further conversion of the vaporized and aerosolized intermediate product from the first stage into final product.

In certain embodiments, a type of energy other than microwave energy may be used in any stage. Examples may include thermal energy, in which case the system may include a thermal energy source, and acoustic energy, in which case the system may include an acoustic energy source. The system may include a single generator that directs energy into both reaction chambers, two generators of the same type, or two generators of different types. These options may be extended to additional reaction chambers in a system that has three or more stages in series. Various examples of process conditions for each stage are disclosed in, for example, U.S. Patent Application Pub. No. 2013/0213795, published Aug. 22, 2013, the disclosure of which is fully incorporated herein by reference.

Optionally, one or more conditioning devices, such as filters, membranes, settlers, centrifugal separators, distillation devices, or other processing devices may be provided between the first and second stages described above. For example, a separator may divert product produced by the first stage to a filtration device for filtration before the product is returned to the second stage. In addition, a third stage, a fourth stage, or any number of additional stages may be added to provide additional processing steps in a multi-stage system.

In certain embodiments, one or more of the frequency, type, and intensity of the energy, the specific composition of the process gases introduced, the processing times, and other parameters in one or both of the reaction chambers may be varied. For example, in an embodiment various parameters in the first reaction chamber may be tuned to completely process coal particles in the feedstock to as intermediate product stream of lesser quality than the desired final product, and various parameters in the second reaction chamber may be tuned to improve the quality of the intermediate product stream and form a final product stream.

In another embodiment, various parameters in the first reaction chamber may be tuned to partially process coal particles in the feedstock to form unprocessed and/or partially processed intermediate product, and various parameters in the second reaction chamber may be tuned to completely process the intermediate product to form a final product stream. Examples of intermediate product may include heavier hydrocarbons and examples of final products may include lighter hydrocarbons.

Alternatively and/or additionally, the system may include two (or more) second stage vessels such that the intermediate product stream may be divided directed to the additional second stage vessels. In certain embodiments, the intermediate product stream may be divided such that a first intermediate stream may include intermediate product of lesser quality than the desired final product, and the second intermediate second stream may include unprocessed and/or partially processed intermediate product.

In certain embodiments, only a part of the intermediate product may be directed to the second stage of the system. In certain other embodiments, a part of the intermediate product may be redirected to the first stage reaction vessel 401.

The system shown in FIG. 4 corresponds to the system of FIG. 1, but it is contemplated that instead of the waveguide and reaction chamber system one or more of the stages may use a surfatron structure (with no separate waveguide) such as that shown in FIG. 2. In addition, although the system shown in FIG. 4 shows a separate microwave generator serving each stage, it is contemplated that one generator could serve both stages in various embodiments. The processing time, frequencies, and intensity in each chamber may be the same, or they may differ based on the desired results. For example, if the intermediate product is delivered directly from the first stage into the second stage, the second stage may be able to operate at a lower power, or a shorter processing cycle, because the material will already be heated from the first cycle processing. Alternatively, the intermediate material may be held in a storage tank or similar intervening structure before delivery to the second stage.

In an example embodiment, the intermediate product may be char, or solid carbonaceous material with decreased volatile content and increased ash and mineral content. Coke may be electrically conductive. In certain embodiments, the feedstock may be processed by heating in the presence of thermal energy in the first stage, to produce char. The char may then be processed using microwave energy in the second stage to produce liquid fuel. It should be noted that increased conductivity of char in the second stage may increase the efficiency and yield of the process.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method for converting hydrocarbon materials into a product, comprising:
   receiving, in a first chamber, a hydrocarbon feedstock;
   receiving, in the first reaction chamber, a process gas;
   delivering a first type of energy into the first reaction chamber to form a first set of process conditions that activates or ionizes the process gas and converts the hydrocarbon feedstock into an intermediate product;
   delivering the intermediate product and the activated and/or ionized process gas to a second reaction chamber;
   delivering a second type of energy into the second reaction chamber to form a second set of process conditions, wherein one of the first type of energy or the second type of energy comprises microwave energy and the other of the first type of energy or the second type of energy is a type of energy other than microwave energy; and
   using, in the second reaction chamber in the presence of the second type of energy, the activated and/or ionized process gas to convert the intermediate product into a final product.

2. The method of claim 1, wherein:
   the process gas comprises methane;
   the hydrocarbon feedstock comprises coal; converting the hydrocarbon feedstock into the intermediate product comprises converting the coal into a vaporized and/or aerosolized hydrocarbon; and
   converting the intermediate product into the final product comprises converting the vaporized and/or aerosolized hydrocarbon into the final product.

3. The method of claim 1, wherein:
   the intermediate product has a lower molecular weight and lower boiling point than the hydrocarbon feedstock; and
   the intermediate product has a higher molecular weight and lower boiling point than the final product.

4. The method of claim 1, wherein:
   the first type of energy comprises microwave energy; and
   the second type of energy comprises thermal energy.

5. The method of claim 1, wherein the second set of process conditions comprises a higher residence time and a lower power draw as compared to the first set of process conditions.

* * * * *